(No Model.)

C. F. PARKER & L. E. MARQUISEE.
COAL OIL STOVE.

No. 328,511. Patented Oct. 20, 1885.

Witnesses:
N. H. Davis
A. Willson

Inventors
C. F. Parker
L. E. Marquisee
by J. J. Greenough
Atty.

UNITED STATES PATENT OFFICE.

CHARLES F. PARKER AND LOUIS E. MARQUISEE, OF SYRACUSE, N. Y.

COAL-OIL STOVE.

SPECIFICATION forming part of Letters Patent No. 328,511, dated October 20, 1885.

Application filed February 4, 1884. Serial No. 119,688. (No model.)

*To all whom it may concern:*

Be it known that we, CHARLES F. PARKER and LOUIS E. MARQUISEE, of the city of Syracuse, Onondaga county, State of New York, have invented certain Improvements in Coal-Oil, Gas, or Gasoline Stoves for Cooking, Heating, &c., of which the following is a specification.

Our invention is of certain apparatus for conveniently filling the oil-tank, trimming and lighting the wicks and burners in said stoves, and in the air-passages and ovens therefor. We attain the object of our invention by the devices illustrated in the accompanying drawings, in which—

Figure 1:
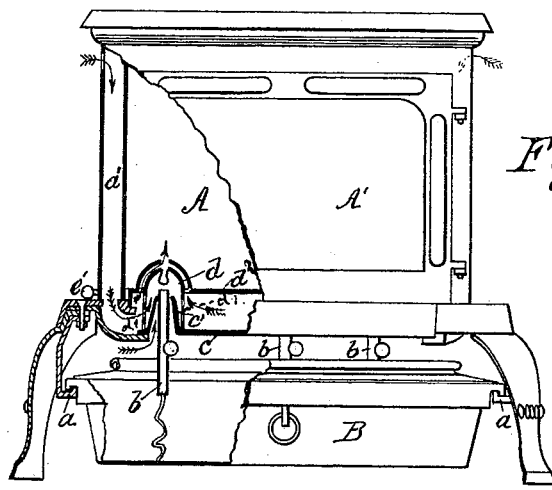
Figure 2:
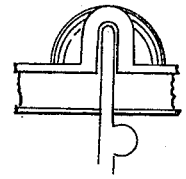
Figure 3:
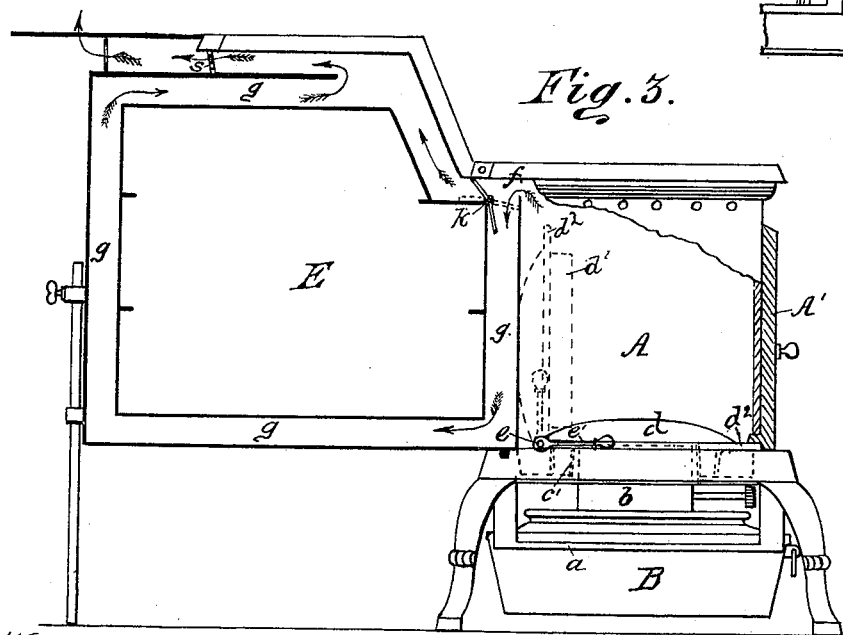

Figure 1 is a front elevation, partly in section; Fig. 2, a modification of the burner-cones; Fig. 3, side elevation showing oven partly in section.

The references are the same for like parts in all figures.

In Fig. 1 parts are shown in section. On the left the front is removed to show the interior devices.

The arrangement of the cones, burners, &c., is such as to permit the introduction of the oil-tank and burners, and their withdrawal without removing or disturbing the heating chamber or oven.

The parts are constructed as described, subject to such modifications of form, proportion, and size as may be desired.

A is the combustion or fire chamber of the stove. It is an oblong box, similar to ordinary stoves for like purposes, having boiler-holes and covers on top, and standing on legs or otherwise elevated. (See Fig. 1.) Beneath chamber A an oil-tank is suspended on slides $a$, so as to be readily drawn out from the heating-chamber and replaced, as hereinafter described. Above the oil-tank B a plate, $c$, is placed, supported so as to be drawn out with the oil-tank. This plate $c$ forms the bottom plate of an air-passage, about to be named, at the bottom of the combustion-chamber. This plate has projections $c'$ upward around the wick-tubes $b$, that are affixed to the cover of the oil-tank, by which the wick-tubes $b$ are kept cool by the circulation of air below them nearly up to the top of the tubes that project up into the cones $d$, hereinafter described.

The cones $d$ are connected with and form a part of plate $d^2$. They are located over the wick-tubes, having the usual slot for the blaze to pass through. A perforated plate, $d'$, surrounds the base of the cone $d$, to which it is affixed, extending down to the plate $c$, and allows the air between said plates $c$ $d^2$ to pass through into the interior of the cone $d$, and supply the burner therewith. It will be seen that the cone $d$ is double, with a space between the outer and inner shells. The plate $d'$ is perforated to let air from below into the space between the shells of cone $d$, where it is heated, from which it rushes out through the opening above, and impinges upon the flame, increasing thereby its combustion. The plate $d^2$, with its cones $d$, is affixed to a rod or axis, $e$, at the rear edge, on which it is hinged, so as to be turned up and raise the cones above the wick-tubes $b$, and so free them that they can slide out with the oil-tank without obstruction. This movement is made by means of an arm, $e'$, outside the chamber, affixed to the end of the shaft $e$. When the oil-tank is removed and filled and the wicks trimmed, these parts are slid back into place and the cone-plate is turned down, bringing the cones $d$ down over the wicks after they are lighted, which produces the proper combustion. The wick is raised and lowered in the usual way.

The front door, A', of the chamber A is hinged and swings horizontally, in the usual way. Its lower edge projects inward, so that when the door is closed it shuts over the front edge of the plate $d'$ and fastens it down till the door is opened.

It will be noticed that the sides of the combustion-chamber are double at $a'$, forming air-flues that prevent the radiation of heat and warm the descending current of air that passes between the plates $d'$ and $c$ to the burners, as before described. The door may also be double for the same purpose.

When the heat generated by the burners rises in the combustion-chamber, its exit is at $f$, and if for heating purposes alone it enters a chamber above, but if an oven, E, is to be heated, attached in the rear of chamber A, Fig. 3, it enters a flue, $g$, which surrounds the front, top, bottom, and rear sides, there being a damper, $k$, at the point of entrance that, by opening the front flue of the oven and closing the top flue, directs the heat down through the front flue under the oven, and up the rear flue, as shown by the arrows in the drawings, Fig. 3. When damper $k$ is turned so as to open a passage into the top flue, and the downflue is closed, the heat passes off over the oven and under any cooking utensil placed in boiler-holes in the top. The exit-opening of the flue is covered by a perforated screen, S, to prevent the disturbance of the draft.

We are aware that single cones have been hinged and raised by handles in front. These we do not claim. Our cones do not move separately, but are attached to a common hinged plate, whereby they are simultaneously raised.

Having thus described our improved coal-oil stove, what we claim as our invention, and desire to secure by Letters Patent, is—

1. The combination of a series of cones, $d$, with a plate, $d^2$, hinged on a shaft, $e$, and having an arm, $e'$, thereon outside the combustion-chamber to raise and lower the cones, for the purposes specified.

2. The combination of the removable sliding plate $c$, forming the bottom of the air-passage, with the tubes and oil-tank with which it slides into and out of place below the combustion-chamber, as described.

3. The combination, with a burner, of the following parts: the cones $d$ and perforated plates $d'$, attached to the hinged plate $d^2$, and the plate $c$, constructed and arranged substantially as and for the purposes specified.

4. The combination of the door of the combustion-chamber, having an inward projection near its lower edge, with plate $d'$ to hold said plate from being raised when the door is closed, as specified.

In witness of this our invention we hereto set our hands.

CHARLES F. PARKER.
LOUIS E. MARQUISEE.

Witnesses:
J. P. MUNRO,
J. J. GREENOUGH.